United States Patent
Chang et al.

(10) Patent No.: US 7,839,019 B2
(45) Date of Patent: Nov. 23, 2010

(54) MULTIPURPOSE PORTABLE STORAGE AND SUPPLY SYSTEM

(76) Inventors: Chun-Chieh Chang, 2250 N. Triphammer Rd. H2E, Ithaca, NY (US) 14850; Olivia Pei-Hua Lee, 217 Elsmere Pl., Fort Lee, NJ (US) 07024

( * ) Notice: Subject to any disclaimer, the term of this patent is extended or adjusted under 35 U.S.C. 154(b) by 135 days.

(21) Appl. No.: 12/156,253

(22) Filed: May 30, 2008

(65) Prior Publication Data

US 2009/0296442 A1    Dec. 3, 2009

(51) Int. Cl.
*H02J 9/00* (2006.01)
(52) U.S. Cl. .......................................... 307/64; 307/66
(58) Field of Classification Search ................... 307/64, 307/66
See application file for complete search history.

(56) References Cited

U.S. PATENT DOCUMENTS

| | | | |
|---|---|---|---|
| 4,673,826 A * | 6/1987 | Masson | 307/66 |
| 5,576,533 A | 11/1996 | Tantraporn | 250/214 R |
| 6,184,593 B1 | 2/2001 | Jungreis | 307/64 |
| 7,388,348 B2 * | 6/2008 | Mattichak | 320/101 |
| RE40,663 E * | 3/2009 | Silverman | 307/43 |
| 2004/0121232 A1 | 6/2004 | Kato et al. | 429/217 |
| 2005/0146223 A1 * | 7/2005 | Kanouda et al. | 307/66 |
| 2005/0156564 A1 | 7/2005 | Krieger | 320/112 |
| 2007/0285049 A1 * | 12/2007 | Krieger et al. | 320/105 |

* cited by examiner

*Primary Examiner*—Robert L. DeBeradinis
(74) *Attorney, Agent, or Firm*—Kratz, Quintos & Hanson, LLP

(57) ABSTRACT

A portable power storage and supply system having means for AC charging, DC charging, AC discharging and DC discharging wherein any one or any combination of the AC and DC charging and discharging can be carried at one time. The system includes an inverter, one or more battery modules and control means for controlling the AC and DC charging and discharging functions for safe and efficient operation. DC charging can include energy from a renewable energy source. The battery modules are separable from the system for providing DC energy for energizing automotive battery jumper cables or for energizing DC powered devices.

14 Claims, 12 Drawing Sheets

MULTIPURPOSE PORTABLE STORAGE AND SUPPLY SYSTEM

FIELD OF INVENTION

The present invention is concerned with a portable power storage and supply system suitable for a wide variety of cordless applications and a non-stop uninterrupted power supply application.

BACKGROUND OF THE INVENTION

The present invention is a multipurpose portable power storage and supply system. Conventionally, a power source is usually specified with a specific application. For example, an uninterrupted power supply (UPS) is only used for back up power purpose, a power bank is usually used for powering some DC devices . . . etc. There is no power system that can serve as an UPS, a portable AC power source, and a portable DC power source which allows recharging of the system using grid AC power source, regulated DC power source, or even renewable energy source such as photovoltaics and wind turbine. The expandable nature of the present battery modules further enhances the flexibility of the system being used for many applications and needs. The mechanisms that enable variety of charging sources and discharging forms, the designs of compatibility between the inverter, battery module (s), and solar panel, and further unique design of the system integration, all together enables an energy storage and supply system being applicable for a wide variety of applications at the same time.

The power storage and supply system of the present invention consists of an inverter and an expandable number of multiple battery modules being connected in parallel. This power storage and supply system allows AC and DC power source for charging of the battery modules and at the same time allows AC and DC power when discharging the battery modules. This power storage and supply system can become an ideal power source for all portable applications such as a cordless lawn mower, a vacuum cleaner, a vehicle battery jumper, an uninterrupted power supply (UPS), and even a storage device for a solar panel. The design and functions of an inverter, a battery module unit, and the methods of integration of the inverter with the battery modules being connected in parallel will be described in detail in later sections.

OBJECT OF THE INVENTION

It is an object of the present invention to have one portable power storage and supply system that provides energies in AC and DC form which accepts power sources in either AC and DC form. The expandable nature of the battery modules and the AC/DC output capability allows one system which is applicable for a wide variety of applications including cordless devices and even a non-stop UPS system.

SUMMARY OF THE INVENTION

A portable power storage and supply system which can be recharged with either AC or DC power sources simultaneously or separately. The system is designed to satisfy a wide variety of applications requiring either AC or DC power sources. The expandable nature of battery modules, the types and configurations of DC outputs on the battery modules, and the AC outputs residing in the inverter make the system flexible while being applicable for a wide variety of applications. The requirements and functions proposed for satisfying the compatibility and expandability of the system which includes an inverter, battery modules, and renewable energy sources are further described and demonstrated.

DESCRIPTION OF THE DRAWINGS

FIG. 5($b$) shows the configuration of the system being discharged by the AC devices and recharged by grid AC power source;
FIG. 5($c$) shows the configuration of the system being discharged by the AC devices and recharged by DC (solar panel) power source;
FIG. 5($d$) shows the configuration of the system being discharged by the AC devices and recharged by AC and DC (solar panel) power sources simultaneously;
FIG. 6($b$) shows the configuration of the system being discharged by the DC devices and recharged by a DC (solar panel) power source;
FIG. 6($c$) shows the configuration of the system being discharged by the DC devices and recharged by AC and DC (solar panel) power sources simultaneously.

DETAILED DESCRIPTION OF THE INVENTION

The Inverter

Figure 1:
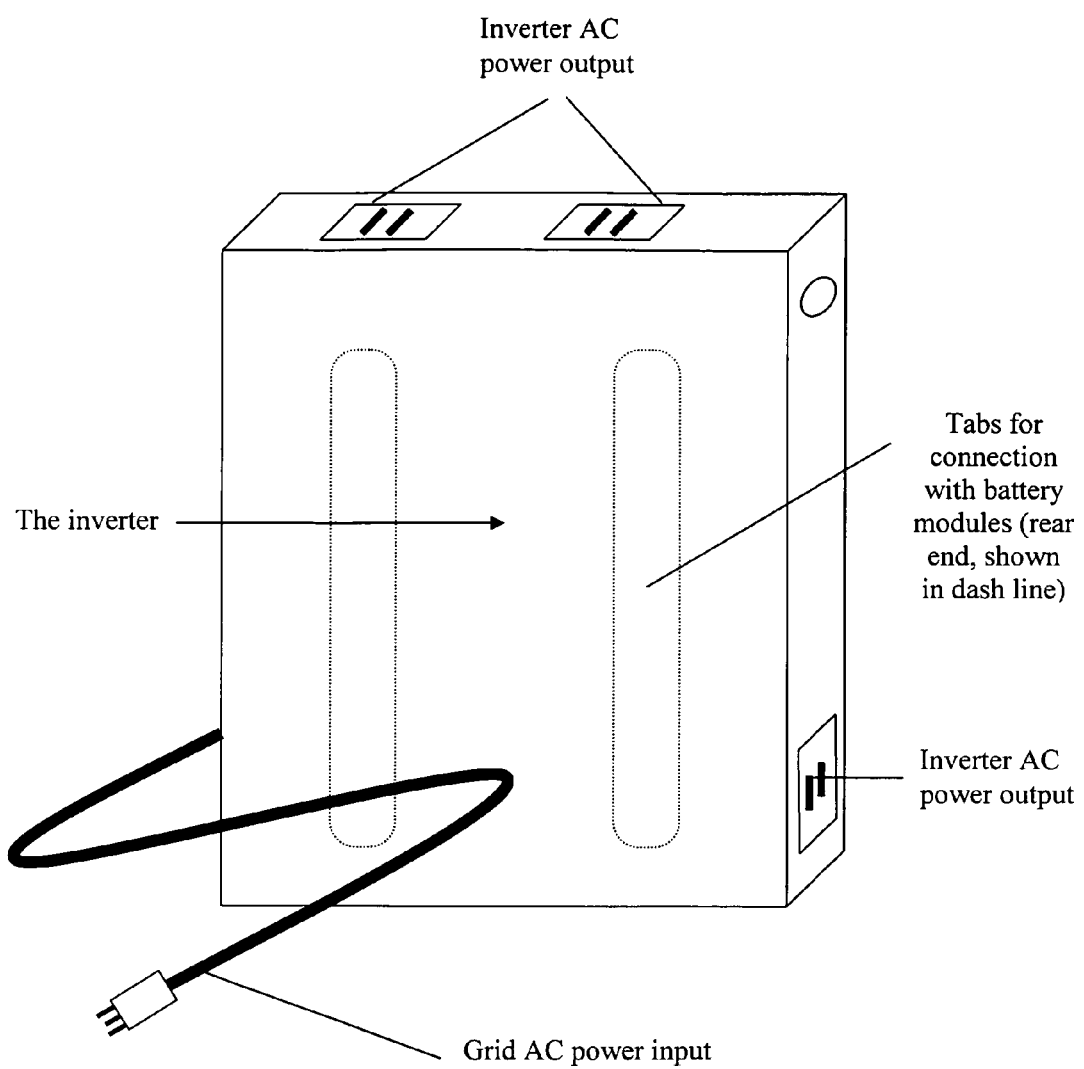
FIG. 1 shows the design and function of the inverter.

Conventionally, an uninterrupted power supply (UPS) system has an inverter that converts an AC grid power source to a DC power source that recharges the batteries. Since there is no possibility of an input of external DC power sources (e.g. solar panel) for conventional UPS system applications, the design of the inverter for conventional UPS is simple compared to the multipurpose portable power storage and supply system of the present invention. The stand alone nature of the inverter that is ready to be hooked up to the battery module(s), as will be disclosed in the present invention, enables one system to be ready to be applicable for a wide variety of cordless applications. The design of the inverter is shown in FIG. 1. The functions of the inverter shown in FIG. 1 include:
1) Convert grid AC power sources (110/220V) to lower voltage DC power (e.g. 14.6V). 2) Transform DC power sources (e.g. 12~14V) to high voltage AC power (e.g. 110/220V) for AC devices. 3) Recharge of the battery modules. Since the system disclosed in the present invention is ready to accept renewable power sources (e.g. the solar panel or wind turbine) and the utilization of lithium-ion batteries (preferably the lithium iron phosphorous oxide system), the logic and stipulations set for the inverter of the present invention are quite different from conventional inverters that deal with simpler conditions. Details of the logic and stipulations utilized in the present invention are described below:

Part 1. When Grid Power is Connected

1. When an AC (110/220V) grid power source is connected, the AC (110/220V) output is bypassed from the battery power source. That means the energy source of AC power output is switched from the battery to the grid power supply as soon as the AC grid power supply is accessible.

2. When AC (110/220V) grid power source is connected, the battery (battery modules) are subjected to recharging. The maximum current is set and controlled. A final float charging voltage is also set as $V_H$ and controlled.

3. If the detection of the battery voltage exceeds a preset high limit voltage (usually slightly more than the float charging voltage, termed $V_H'$), the AC (110/220V) grid power source that charges the battery function is terminated until a resume action (re-plug-in into to the AC grid power source) is conducted. This function is specially designed for protecting the inverter being charged by an external DC power source (e.g. solar panel) that causes damage of the inverter when DC power source voltage exceeds the charge voltage (to battery modules) of the inverter.

4. An over-charge protection function for the inverter: If the battery voltage exceeds the maximum durable voltage of the inverter $V_H''$ (e.g. durability of 16V for an inverter that is connected to a 13V battery system), the inverter AC output will be disabled until the voltage drops down the durable voltage of the inverter. Again this is a function that meets the requirements for the case when solar panel power source is available.

Part 2. When Grid Power is Not Connected

1. When there is no grid power source available, the AC output end(s) of the inverter are activated until a low DC voltage limit (detected from the side that connects to the battery, $V_L$) is reached. This means devices will start consuming energy from the battery modules when grid AC power source is not available.

2. While the inverter is converting DC (battery energy) to AC, if the inverter is connected to the grid AC power source, the performance of the devices being connected to the inverter are not affected by actions of the inverter that perform a bypass function and recharge of battery function (please refer to point 1 and 2 of part 1).

3. When battery voltage reaches a low voltage limit set by the inverter $V_L$, no battery output is possible until a preset higher voltage limit $V_L'$ is reached. This function prevents any possibility of over-discharge of the battery again in a short time, without having proper battery recharging. Under this circumstance, only DC power source such as solar panel or grid AC power source can reactivate the normal function of the inverter that uses battery as a power source.

The Battery Module:

Part 1. Control Part of a Battery Module

Figure 2:
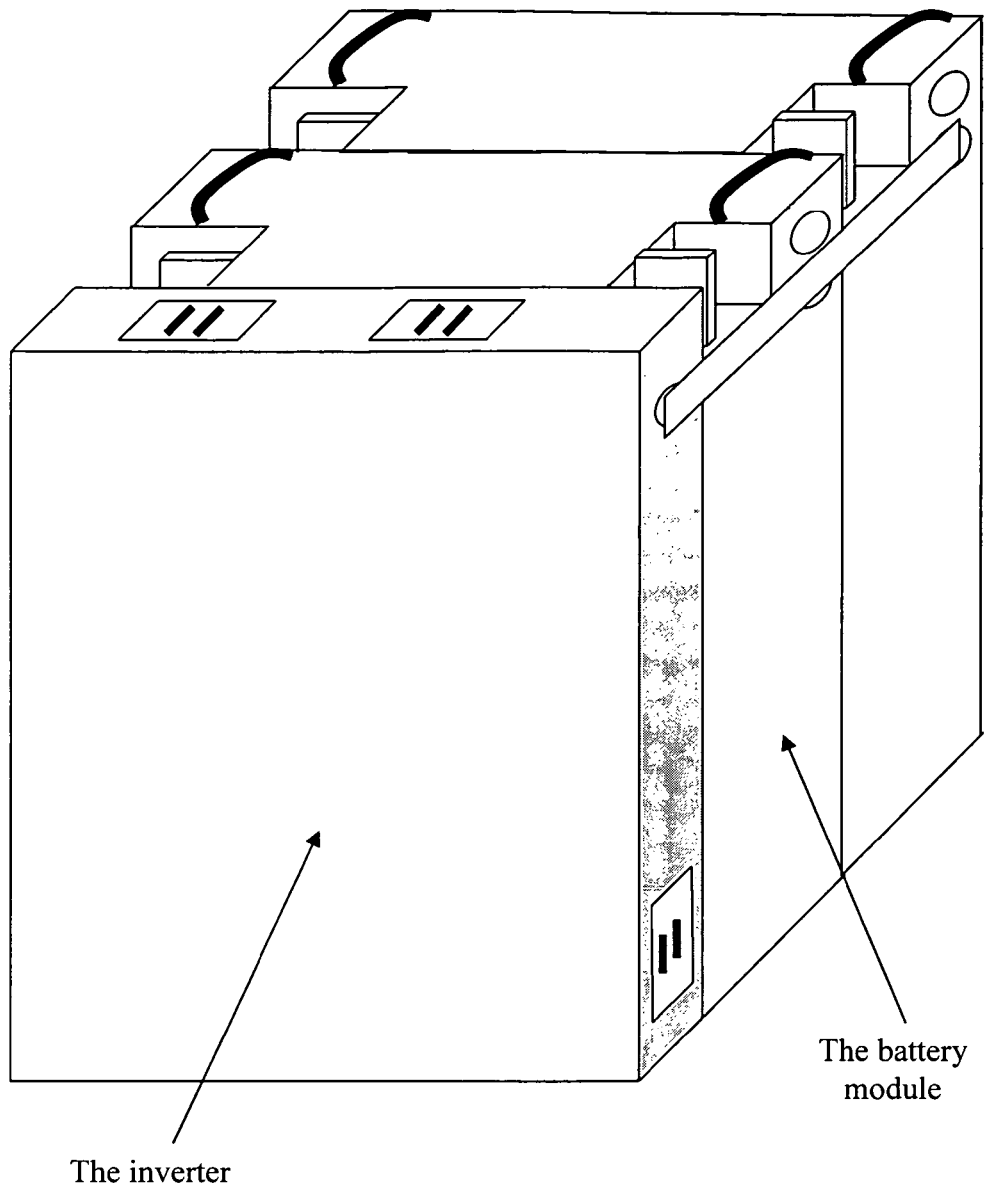
FIG. 2 shows the portable power storage and supply system that can be charged and discharged in both AC and DC form.

In order to enhance an "easy (low cost) for maintenance" and to satisfy the "flexibility (allows wide range of solar system or even wind system)" characteristics of the storage system, a cell protection controller is placed inside each battery module. The controller monitors the voltage of each battery connected in series. Once the controller detects a low voltage ($V_{BL}$) or a high voltage ($V_{BH}$) of any batteries being connected in series, the controller sends a signal for blocking the power input/output using a relay. Under an over-charge condition, the relay is open until a lower voltage ($V_{BH}'$) is reached. In contrast, under over-discharge condition, the relay will be open until a "resume" button is pushed manually (or simply replace the battery module). During the over-discharge condition, a beeper sound or a blinking LED light signal can be generated for calling attention to the abnormal condition. In general, the inverter will cut-off an energy supply from battery modules before the battery low condition ($V_{BL}$) is reached for each battery residing in the battery modules. In the present invention, lithium iron phosphorous oxide (LiFexPyOz) type of lithium ion battery is a preferred battery type. With the use of the lithium iron phosphorous oxide batteries, the high voltage limit set ($V_{BH}$) is preferred to be 4.0V and the low voltage limit set ($V_{BL}$) is preferred to be 2.0V. In general, these limits will not be reached when the inverter is at work (i.e. the inverter reaches $V_H$ and $V_L$ before $V_{BH}$ and $V_{BH}$ are met). A controller embedded in each battery module provides two major functions: (1) Assume one battery module consists of a four battery in series configuration and assume the battery module is kept at 13.4V (same as other battery modules since all modules are connected in parallel as shown in FIG. 2). While one of the battery is internally shorted (short inside the battery itself), the voltage drop of one of the batteries in series will trigger the relay "open" thus preventing other battery modules (same kept at 13.4V) from charging the one (module) that has a defective battery inside. (2) With the use of a beeper sound function, a user can be aware of the integrity of the battery modules by judging the frequency of the beeper sound generation.

Part 2. Functions and Connections of Battery Modules

Figure 3:
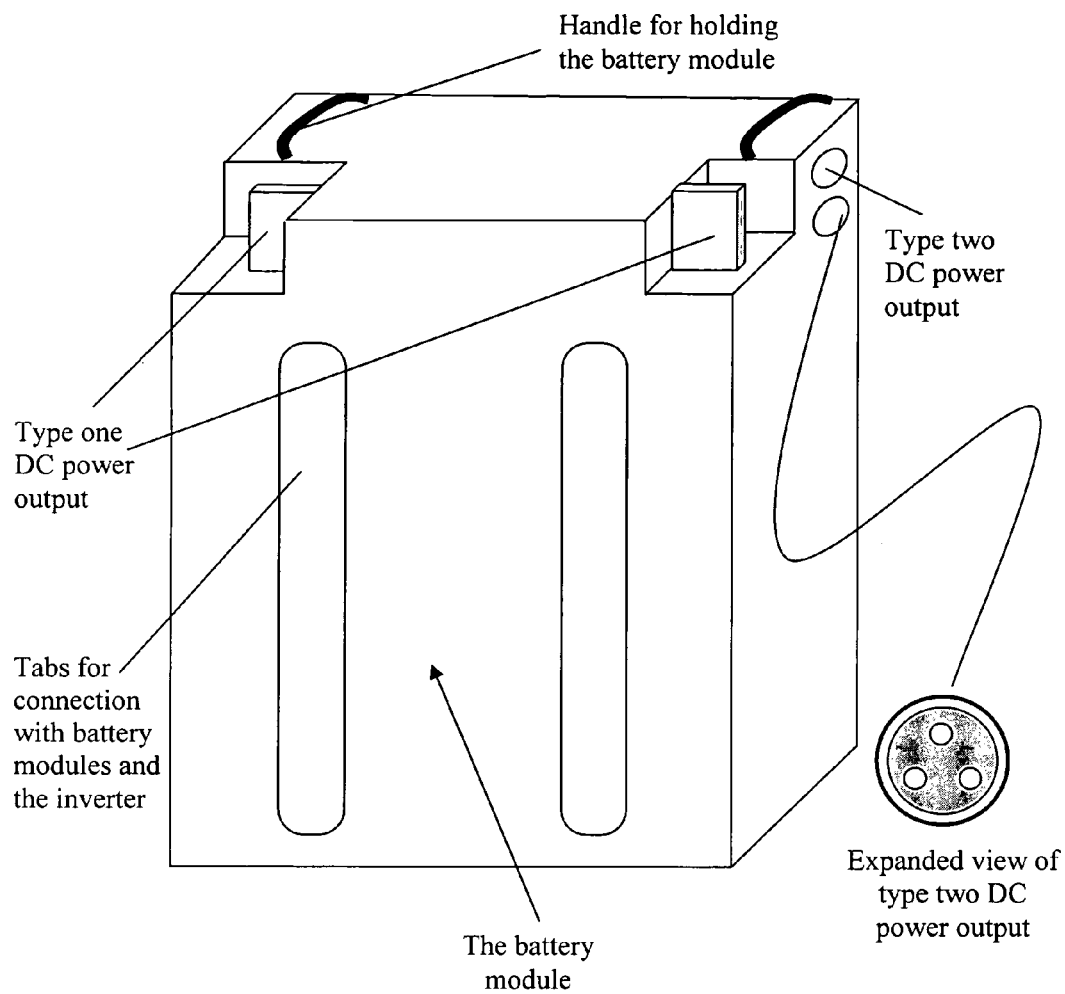
FIG. 3 is the design of the battery module that has an expandable nature.

As indicated in FIG. 3, the battery modules are connected physically through tabs positioned on a front wall of each battery module. The tabs are designed for holding the batteries when they are connected in parallel. This implies that when two battery modules are connected, they can be held as only one battery module. Aside from the tabs, there are two types of outlets designed on each battery module. The first type is specially designed for large current applications such as jumping a vehicle battery. This type of outlet is placed on top of each battery module. The second type of outlet, indicated as two small holes sitting on top or on the side of the battery module, is specially designed for charging and discharging of the battery modules (refer to FIG. 3). The functions and designs of the second type outlet are described as follows:

1. These outlets can be used for DC power supply. For example, they can be used for cordless applications such as portable lawn mower, vacuum cleaner and other home appliances.

Figure 4:
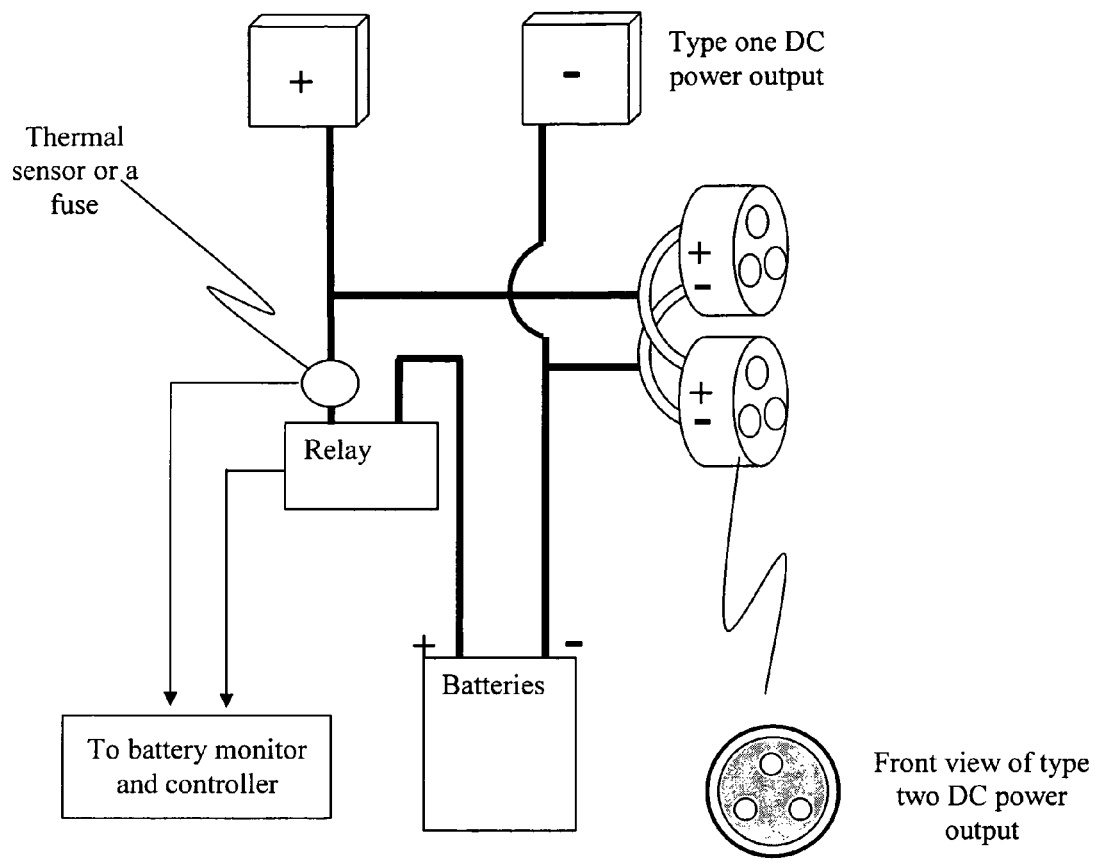
FIG. 4 is the configuration of the controller, the relay, the thermal sensor (or fuse), and DC output arrangements of a battery module.

2. These outlets can be used for charging the battery module(s). While charging the battery module(s) using the inverter, these outlets can be used for connecting to the first battery module (or the inverter) and the third battery module if we consider the current battery module is named the second battery module. These outlets connected using cables allow parallel charging of the battery modules. It should be noted that if one of the modules is out of order or reaches the battery cut-off condition, other battery modules are still charged properly without being affected by the one that is not being charged. The detailed structure of these outlets is shown in FIG. 4.

3. One thermal sensor is placed on one end of the relay as shown in FIG. 4. This thermal sensor controls the "open" or "close" status of the relay. While the temperature is high, the relay will be open until the temperature drops to normal. This function is specially designed for the case in which one of the modules is taken out for normal use and when it is connected back to other modules for charging. One can expect large current might go into the battery module that is relatively empty. Also, this function allows no further limitation of any renewable energy input as will be described next.

4. These outlets can be hooked up to a solar panel. The types and specification of the solar panel are unlimited as long as the thermal sensor is not triggering the relay open. It should be noticed that the solar panel can be hooked up to the first type outlet if all second type outlets are occupied.

The Integrated System:

The examples shown below uses a 250 W inverter, a 13.2V battery module with capacity 20 Ah, and a solar panel that is 75 W in peak power. The inverter has the controls as described in earlier section with a preset $V_H$=14.6, $V_H'$=14.7 and $V_H''$=16.0, $V_L$=11, $V_L'$=12.5. The battery module also has the functions and controls as described earlier with a preset $V_{BH}$=4.0, $V_{BH}'$=3.5, $V_{BL}$=2.0. Limiting current from the battery is 15 A, and limiting current from the inverter is 2.5 A (AC, 110V).

Example 1

AC Discharge, Recharged with AC and DC Power Sources

Figure 5A:
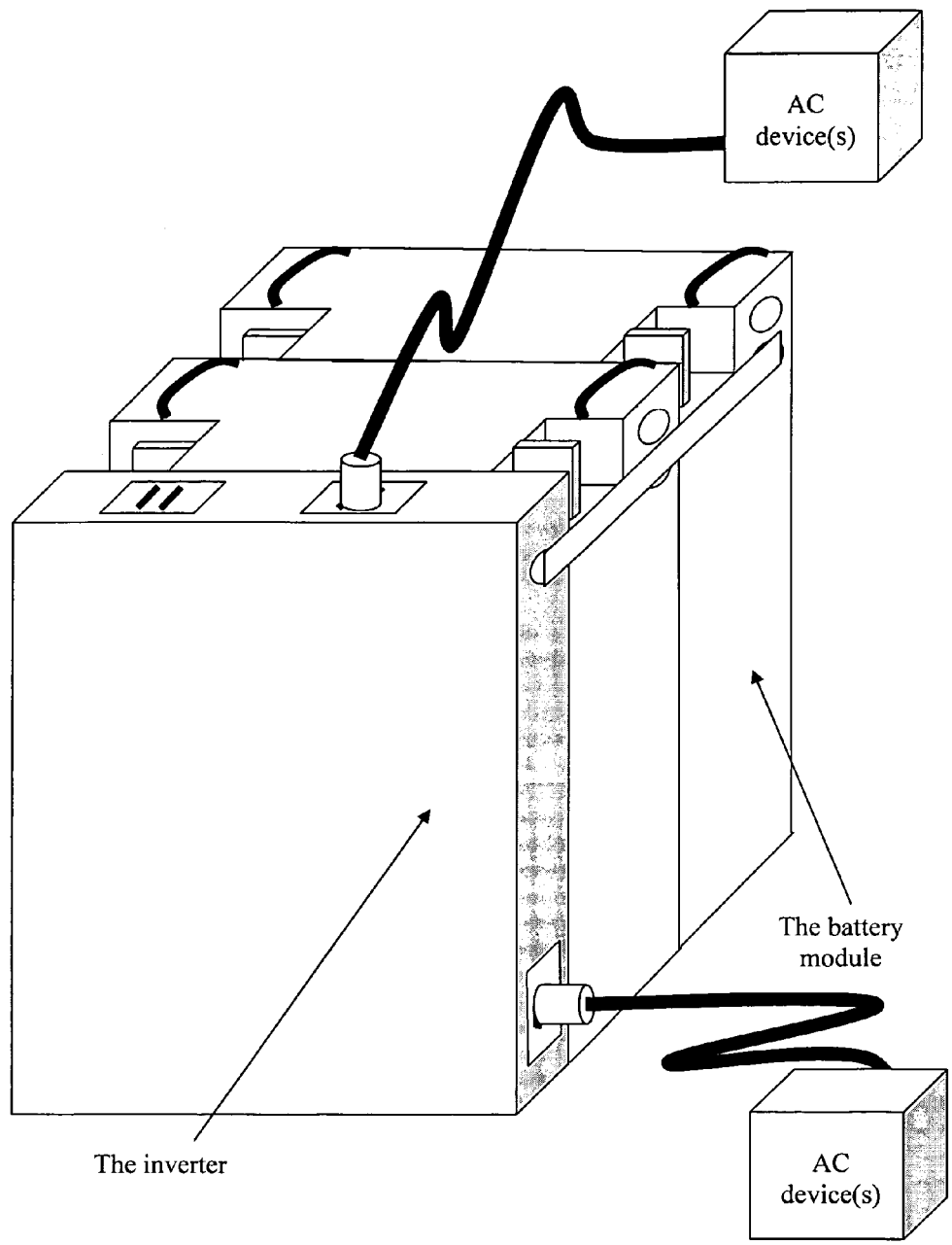
FIG. 5($a$) shows the configuration of the system being used as the energy source for AC devices.

In the present example, the system configuration is indicated in FIG. 5(a). While discharging the system, the low voltage cut-off is controlled by the inverter which is set to be 11V. This system configuration is good for applications such as camping, power source for lap top . . . etc when an AC power source is needed.

Figure 5B:
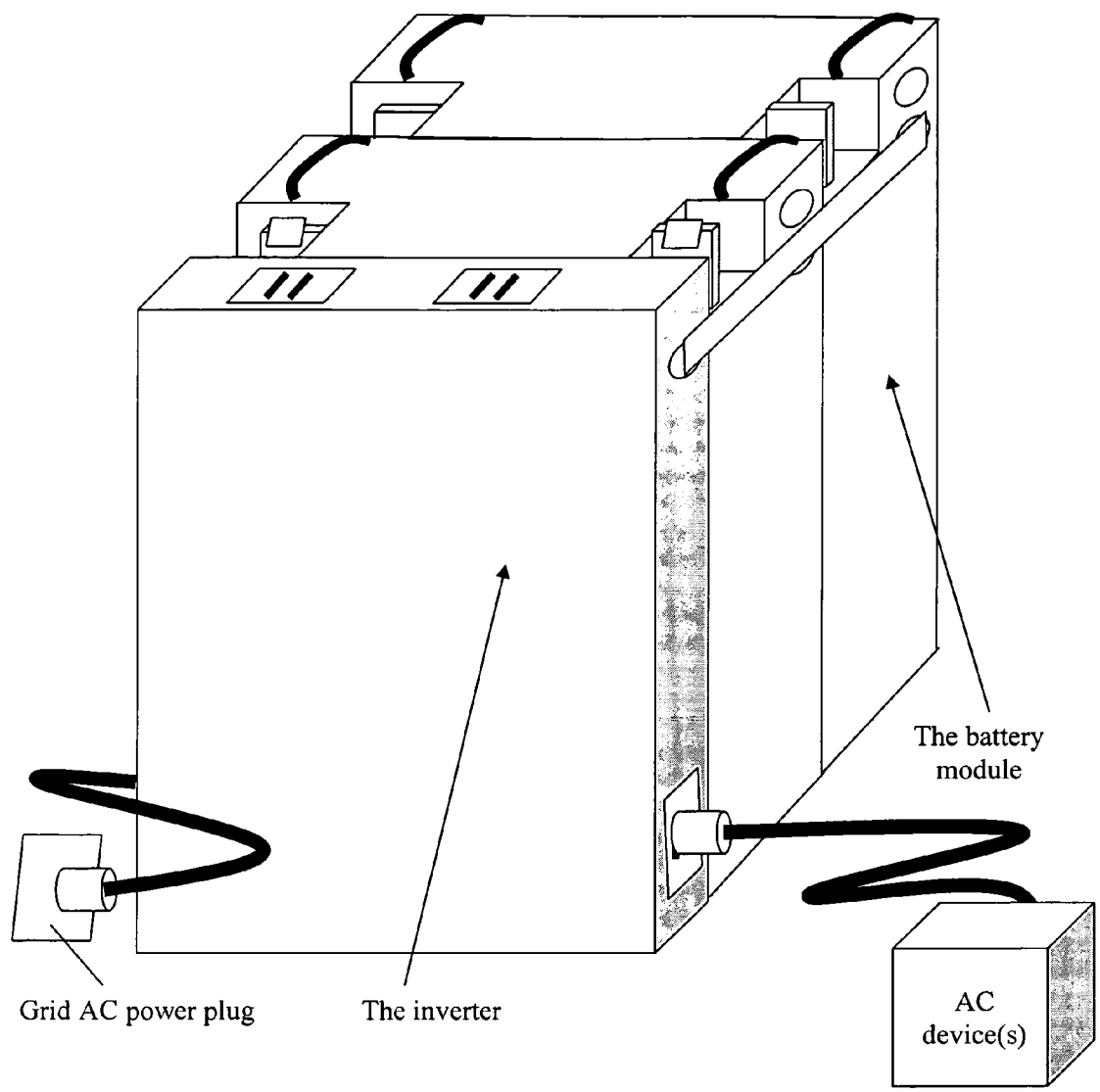

Case I. AC Discharge with AC Charge Before Cut-Off Limit of the Inverter is Reached:

As shown in FIG. 5(b), before AC discharge is complete, if an AC grid power source is provided, the AC device function will not be affected while the power source is switched from battery to grid power. Meanwhile, the battery module is under the recharging condition when grid AC power is present. The system is under charging until a high voltage limit of 14.6V is reached.

Case 2. AC Discharge with AC Charge After Cut-Off Limit of the Inverter is Reached:

Again, as configured in FIG. 5(b), when AC discharge is complete, at that time the output power is stopped by the inverter's low voltage limit (11V). If an AC grid power source is provided, the AC device function is resumed owing to the power source coming from the grid. Meanwhile, the battery module is under the recharging condition when grid AC power is present. The system is under charging until a high voltage limit of 14.6V is reached. One condition goes as if the grid AC power is disconnected before $V_L'$ is reached (12.5V), the AC device performance is stopped owing to insufficient charging to the battery that may cause rapid over-discharge of the battery module.

Figure 5C:
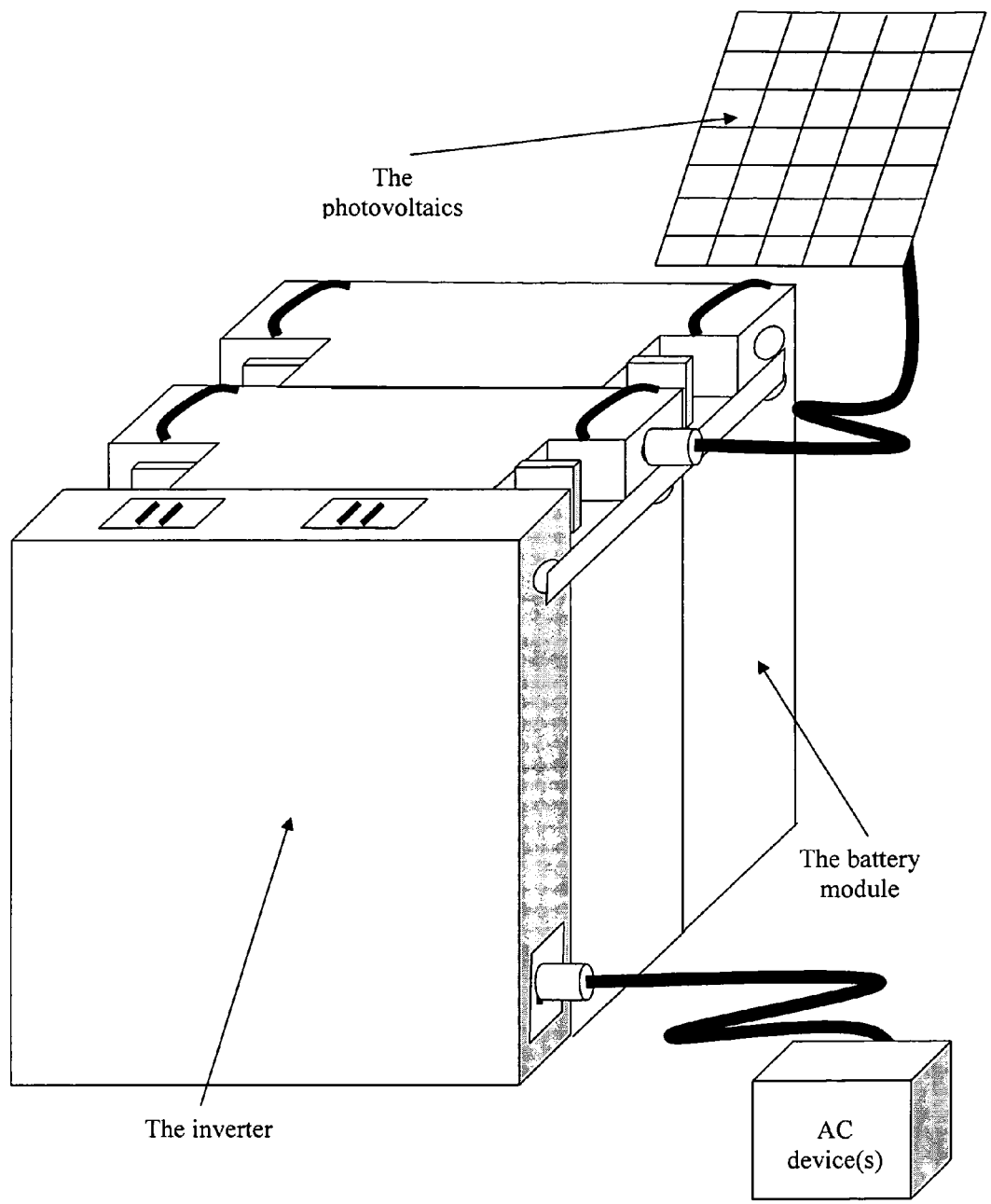

Case 3. AC Discharge with DC Charge Before Cut-Off Limit of the Inverter is Reached:

As shown in FIG. 5(c), before AC discharge is complete, if a DC power source is provided, the AC device function will not be affected by the DC power input. However, if an overcharge condition is reached (over 4.0V of any of the batteries), the battery relay is opened until the battery voltage drops to a lower voltage of $V_{BH}'$=3.5V (relay close). On the other hand, if the voltage of the solar panel exceeds $V_H'$ (16.0V), the inverter AC output to the device is terminated until the voltage drops down below $V_H'$.

Case 4. AC Discharge with DC Charge After Cut-Off Limit of the Inverter is Reached:

Again, as configured in FIG. 5(c), when AC discharge is complete, at that time the output power is stopped by the inverter's low voltage limit (11V). If a DC power source is provided at that time, the AC device function is not resumed until the battery voltage exceeds a higher preset voltage $V_L'$=12.5V. Nonetheless, if an over-charge condition is reached (over 4.0V of any of the batteries), the battery relay will be open until battery voltage drops down to a lower voltage of $V_{BH}'$=3.5V (relay close). On the other hand, if the voltage of the solar panel exceeds $V_H''$ (16.0V), the inverter AC output to the device will be terminated until the voltage drops below $V_H''$.

Figure 5D:
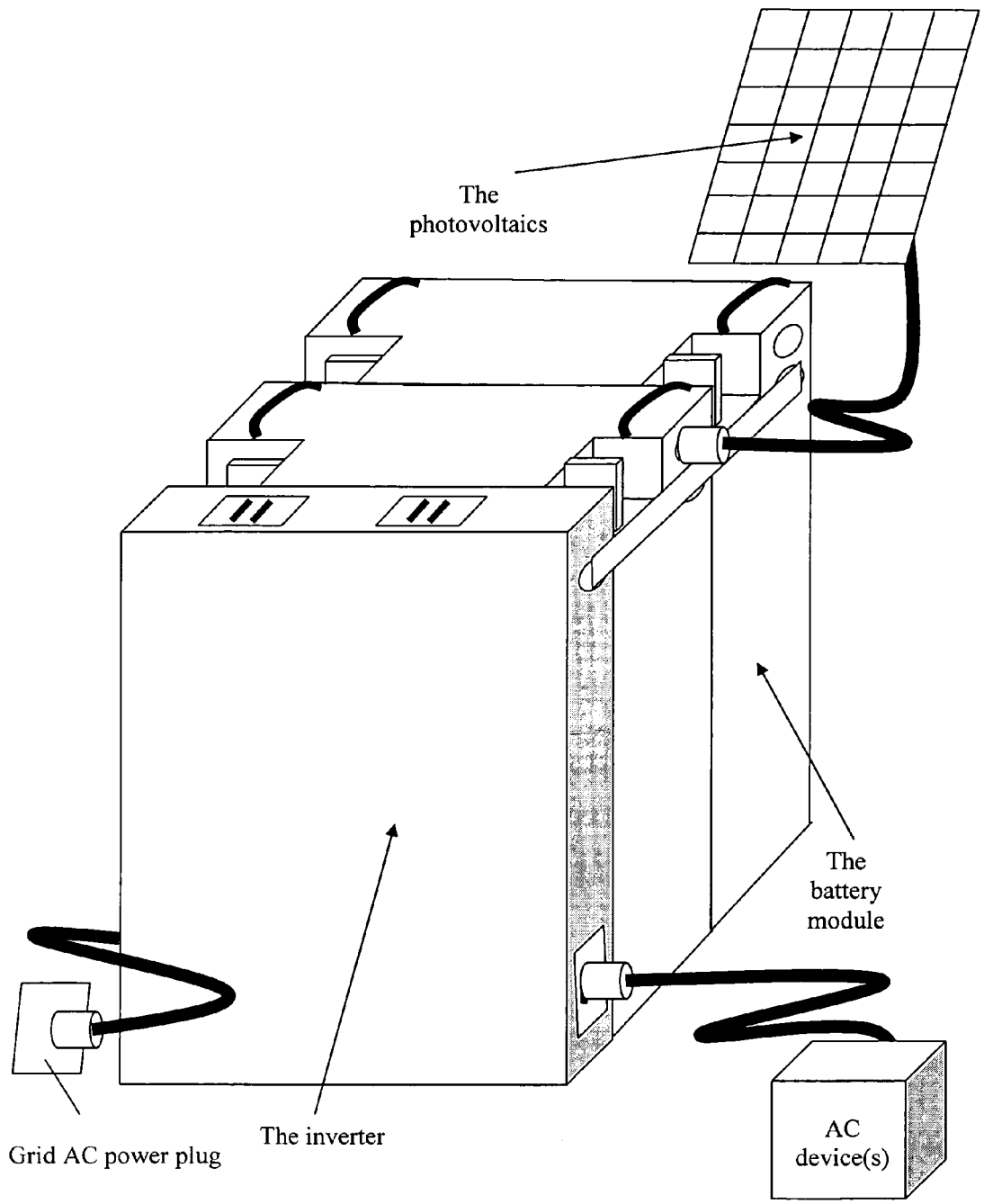

Case 5. AC Discharge with Both AC and DC Charge Before Cut-Off Limit of the Inverter is Reached:

As shown in FIG. 5(d), before AC discharge is complete, if both AC and DC power sources are provided, the AC device is powered by the grid AC power and the battery module is also recharged by both the grid AC power and the solar panel. However, if battery over-charge condition is reached (over 4.0V of any of the batteries), the battery relay is opened until the battery voltage drops to a lower voltage of 3.5V (relay close). During the battery over-charge condition, the voltage of the battery module may become higher than the high voltage limit of the inverter for recharging the battery voltage ($V_H$, 14.6V) and that may damage the inverter. Under such condition, the inverter recharging to the battery module function is disabled (when $V_H'$, 14.7V is met) until a re-plug-in action is conducted. On the other hand, if the voltage of the solar panel keeps increasing until the voltage exceeds $V_H''$ (16.0V), the inverter AC output to the device is terminated until the voltage drops down below $V_H''$. However, since the grid AC power source is present, the AC output is still active but with the energy source from the battery modules disabled.

Case 6. AC Discharge with Both AC and DC Charge After Cut-Off Limit of the Inverter is Reached:

Again, as configured in FIG. 5(d), when AC discharge is complete, at that time the output power is stopped by the inverter's low voltage limit (11V). If both AC and DC power source are provided at that time, the AC device starts consuming the grid AC power and the battery module is also recharged by both the grid AC power and the solar panel. One condition goes as if the grid AC power is disconnected before $V_L'$ is reached (12.5V), the AC device performance is stopped owing to insufficient charging to the battery that may cause rapid over-discharge of the battery module. Again, the same extreme condition occurs if a battery over-charge condition is reached owing to the DC power source (over 4.0V of any of the batteries). Under such condition the voltage of the battery module may become higher than the high recharge voltage limit of the inverter ($V_H$, 14.6V) that may damage the inverter. Under such a condition, the inverter recharging to the battery module function is disabled until a re-plug-in action is conducted. Also, if the voltage of the solar panel keeps increasing until the voltage exceeds $V_H''$ (16.0V), the inverter AC output to the device is terminated until the voltage drops down below $V_H''$. However, since the grid AC power source is present, the AC output is still active but with the energy source from the battery modules disabled.

Example 2

DC Discharge, Recharged with AC and DC Power Sources

In the present example, the system configuration is indicated in FIG. 3 as being only one battery module, is sufficient for being a DC power source. While discharging the system, the low voltage cut-off is controlled by the battery module which is set to be $V_{BL}$=2.0. This stand alone battery module is good for cordless applications such as a DC vacuum cleaner, a lawn mower, a vehicle battery jumper . . . etc, when a DC power source is needed.

Figure 6A:
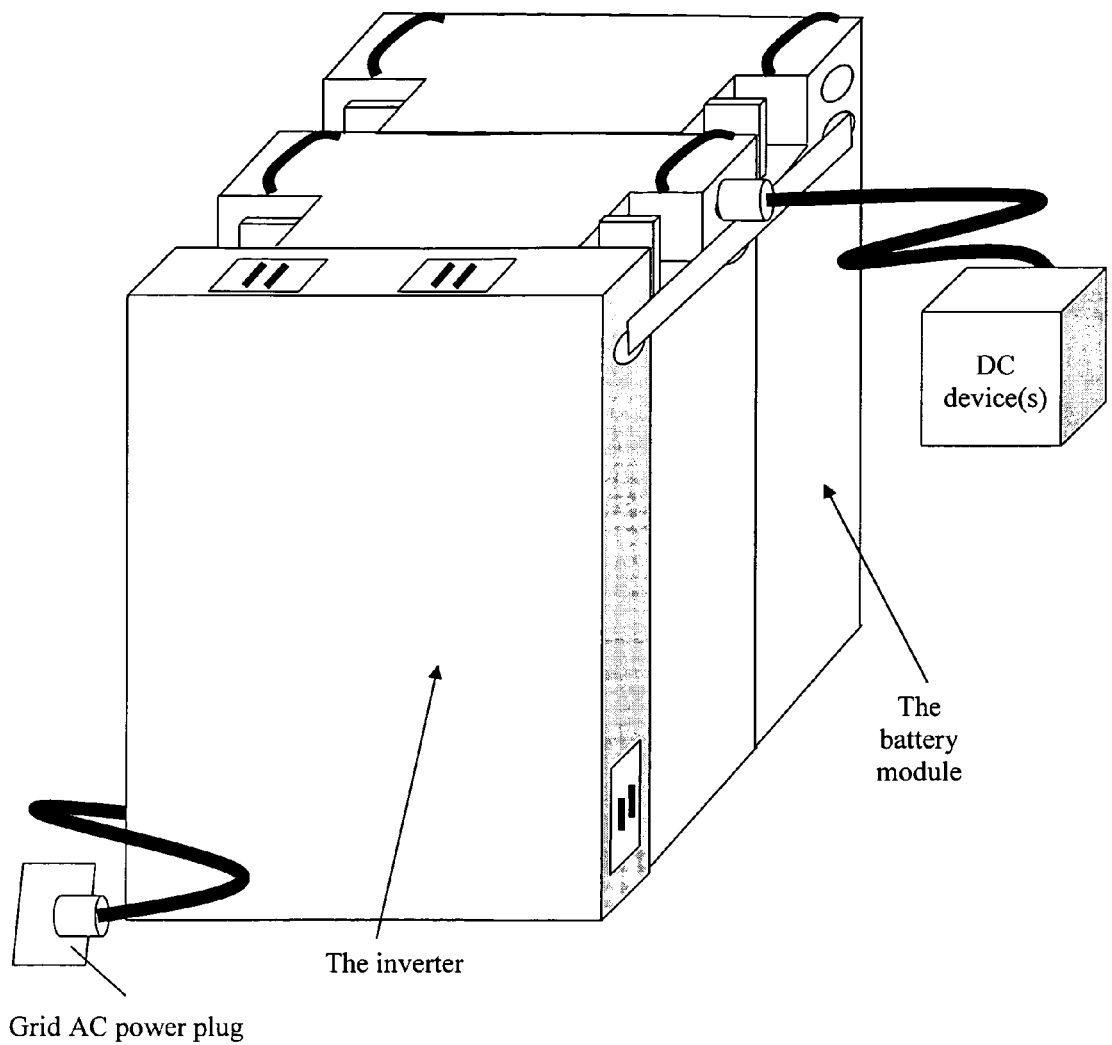
FIG. 6($a$) shows the configuration of the system being discharged by DC devices and recharged by a grid AC power source.
Figure 6B:
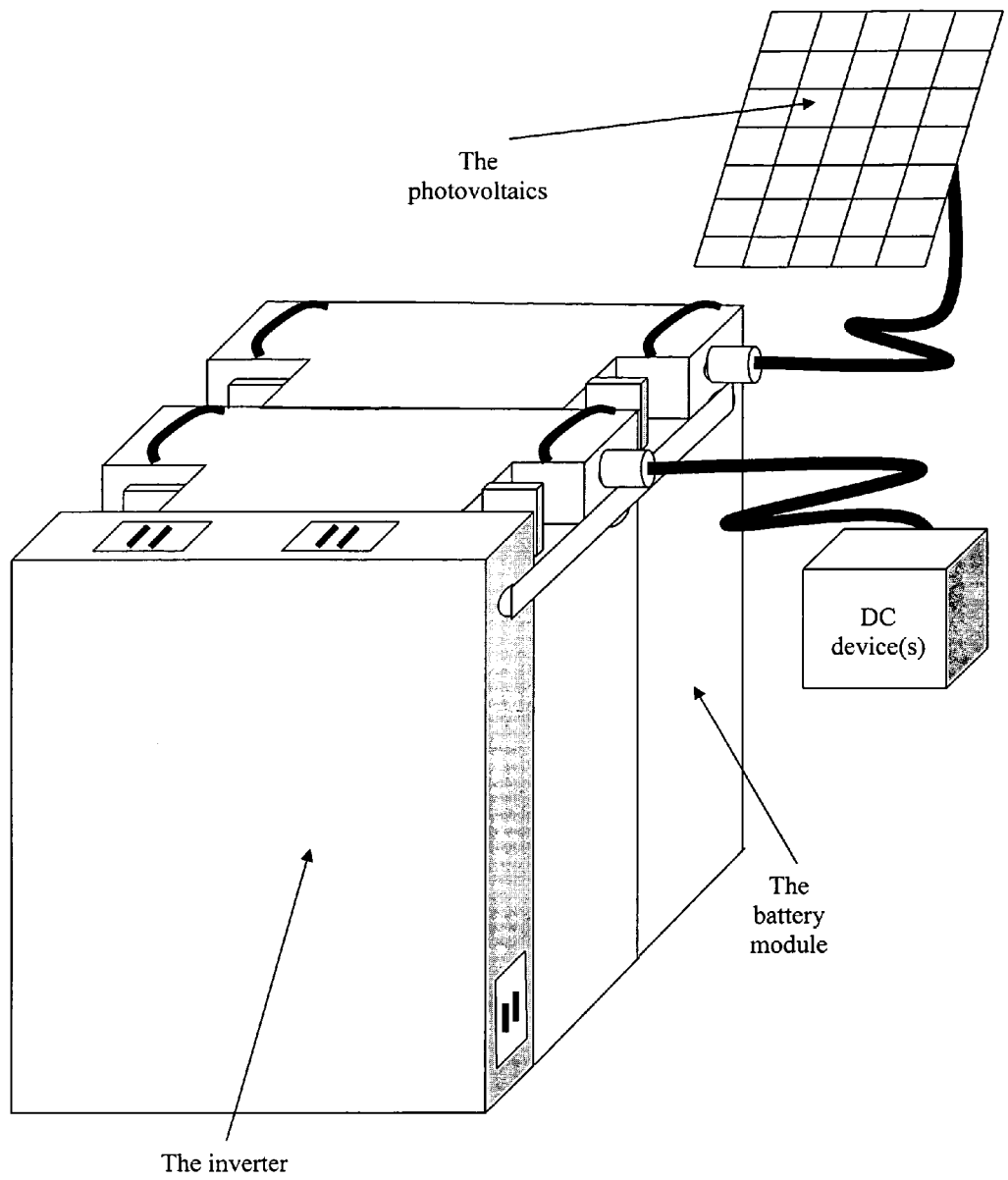
Figure 6C:
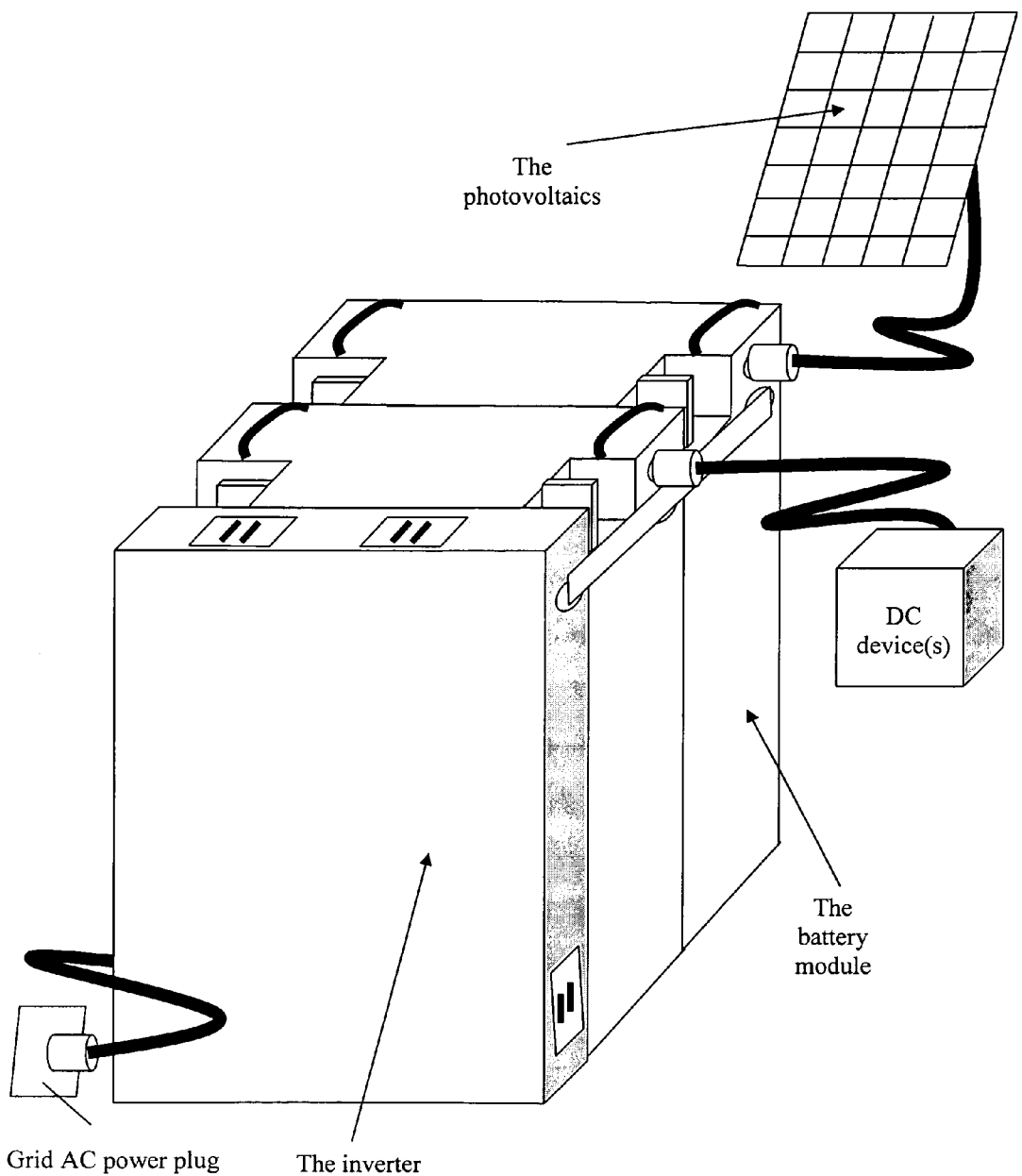

Case I. DC Discharge with AC Charge Before Cut-Off Limit of the Battery Module is Reached:

Before DC discharge is complete, if the battery module is placed in the system and an AC grid power source is provided, as shown in FIG. 6(*a*), the battery module will be under-charging from both the AC grid power source at the same time with another battery module that was not subjected to earlier utilization. This charging process proceeds until a high voltage limit of the inverter ($V_H$, 14.6V) is reached. During this recharging process, if the charge current is too large such that it causes heating of the battery module being charged, the relay of the battery module being charged has an open/close function using the thermal sensor/switch shown in FIG. 4. The DC device function is not affected during this charging process even though the low voltage battery module is detected to have over-heating during the charging process. This is because the other battery module will still serve as a DC power source for powering the DC device.

Case 2. DC Discharge with AC Charge After Cut-Off Limit of the Battery Module is Reached:

When DC discharge is complete, at that time the output power is stopped by the battery module's low voltage limit ($V_{BL}$=2.0V). If the battery module is placed in the system and an AC grid power source is provided, as shown in FIG. 6(*a*), the battery module will not function until a resume button is pressed manually. At that time, the battery module will be under charging from both the AC grid power source at the same time with another battery module that was not subjected to earlier utilization. This charging process proceeds until a high voltage limit of the inverter ($V_H$, 14.6V) is reached. During this recharging process, if the charge current is too large that may cause heating of the battery module being charged, the relay of the battery module being charged has an open/close function using the thermal sensor/switch shown in FIG. 4. The DC device function will not be affected during this charging process even though the low voltage battery module is detected to have overheating during the charging process. This is because the other battery module will still serve as a DC power source for powering the DC device.

Case 3. DC Discharge with DC Charge Before Cut-Off Limit of the Battery Module is Reached:

Before DC discharge is complete, if the battery module is placed in the system and a DC power source is provided, as shown in FIG. 6(*b*), the battery module will be under charging from both the DC power source at the same time with another battery module that was not subjected to earlier utilization. This charging process proceeds until a high voltage limit of the battery module ($V_{BH}$, 4.0V) is reached. During this recharging process, if the charge current is too large such that it may cause heating of the battery module being charged, the relay of the battery module being charged has an open/close function using the thermal sensor/switch shown in FIG. 4. The DC device function will not be affected during this charging process even though the low voltage battery module is detected overheating during the charging process. This is because the other battery module or the solar panel will still serve as a DC power source for powering the DC device. Besides, if all battery relays are all open and still the DC power source input from solar panel is still active, it is possible for voltage (connected to the solar panel) to exceed another inverter limit V'''=16V. Under such circumstance, the inverter AC output function (source from the battery modules) is disabled until the voltage drops down below V'''.

Case 4. DC Discharge with DC Charge After Cut-Off Limit of the Battery Module is Reached:

When DC discharge is complete, at that time the output power is stopped by the battery module's low voltage limit ($V_{BL}$=2.0V). If the battery module is placed in the system and a DC power source is provided, as shown in FIG. 6(*b*), the battery module will not function until a resume button is pressed manually. At that time, the battery module will be under charging from both the DC power source at the same time with another battery module that was not subjected to earlier utilization. This charging process will proceed until a high voltage limit of the battery module ($V_{BH}$, 4.0V) is reached. During this recharging process, if the charge current is too large such that it may cause heating of the battery module being charged, the relay of the battery module being charged has an open/close function using the thermal sensor/switch shown in FIG. 4. The DC device function will not be affected during this charging process even though the low voltage battery module is detected to have overheating during the charging process. This is because the other battery module or the solar panel will still serve as a DC power source for powering the DC device. Besides, if all battery relays are all open and still the DC power source input from a solar panel is still active, it is possible for voltage (connected to the solar panel) to exceed another inverter limit V'''=16V. Under such circumstance, the inverter AC output function (source from the battery modules) is disabled until the voltage drops down below V'''.

Case 5. DC Discharge with Both AC and DC Charge Before Cut-Off Limit of the Battery Module is Reached:

Before DC discharge is complete, if the battery module is placed in the system and both AC and DC power sources are provided at the same time, as shown in FIG. 6(*c*), the battery module will be under-charging from the inverter, the DC power source, at the same time with another battery module that was not subjected to earlier utilization. This charging process will proceed until the high voltage limit of the battery module ($V_{BH}$, 4.0V) is reached followed by the battery relay being open until the battery voltage drops to a lower voltage of 3.5V (relay close). During the battery over-charge process, the voltage of the battery module may become higher than the high voltage limit of the inverter for recharging the battery voltage ($V_H$, 14.6V) and that may damage the inverter. Under such condition, the inverter recharging to the battery module function is disabled (when $V_H'$, 14.7V is met) until a re-plug-in action is conducted. Besides, if all battery relays are all open and still the DC power source input from solar panel is still active, it is possible for voltage (connected to the solar panel) to exceed another inverter limit V'''=16V. Under such circumstance, the inverter AC output function (source from the battery modules) is disabled until the voltage drops down below V'''. However, since the grid AC power source is present, the AC output is still active but with the energy source from the battery modules disabled.

During this entire recharging process, if the charge current is too large such that it may cause heating of the battery module being charged, the relay of the battery module being charged has an open/close function using the thermal sensor/switch shown in FIG. 4. The DC device function is not affected during this charging process even though the low voltage battery module is detected to have overheating during the charging process. This is because the other battery module, the solar panel, or the inverter power will still serve as a DC power source for powering the DC device.

Case 6. Dc Discharge with Both Ac and Dc Charge after Cut-Off Limit of the Battery Module is Reached:

When DC discharge is complete, at that time the output power is stopped by the battery module's low voltage limit ($V_{BL}$=2.0V). If the battery module is placed in the system and both AC and DC power sources are provided at the same time, as shown in FIG. 6(*c*), the battery module will not function until a resume button is pressed manually. At that time, the battery module will be under-charging from the inverter, the DC power source, at the same time with another battery module that was not subjected to earlier utilization. This charging process proceeds until the high voltage limit of the battery module ($V_{BH}$, 4.0V) is reached followed by the battery relay being open until the battery voltage drops to a lower voltage of 3.5V (relay close). During the battery over-charge process, the voltage of the battery module may become higher than the high voltage limit of the inverter for recharging the battery voltage ($V_H$, 14.6V) such that it may damage the inverter. Under such condition, the inverter recharging to the battery module function is disabled (when $V_H'$, 14.7V is met) until a re-plug-in action is conducted. Besides, if all battery relays are all open and still the DC power source input from solar panel is still active, it is possible for voltage (connected to the solar panel) to exceed another inverter limit V'''=16V. Under such circumstance, the inverter AC output function (source from the battery modules) is disabled until the voltage drops down below V'''. However, since the grid AC power source is present, the AC output is still active but with the energy source from the battery modules disabled.

During this entire recharging process, if the charge current is too large such that it may cause heating of the battery module being charged, the relay of the battery module being charged has an open/close function using the thermal sensor/switch shown in FIG. 4. The DC device function will not be affected during this charging process even though the low voltage battery module is detected to have overheating during the charging process. This is because the other battery module, the solar panel, or the inverter power will still serve as a DC power source for powering the DC device.

Example 3

Figure 7:
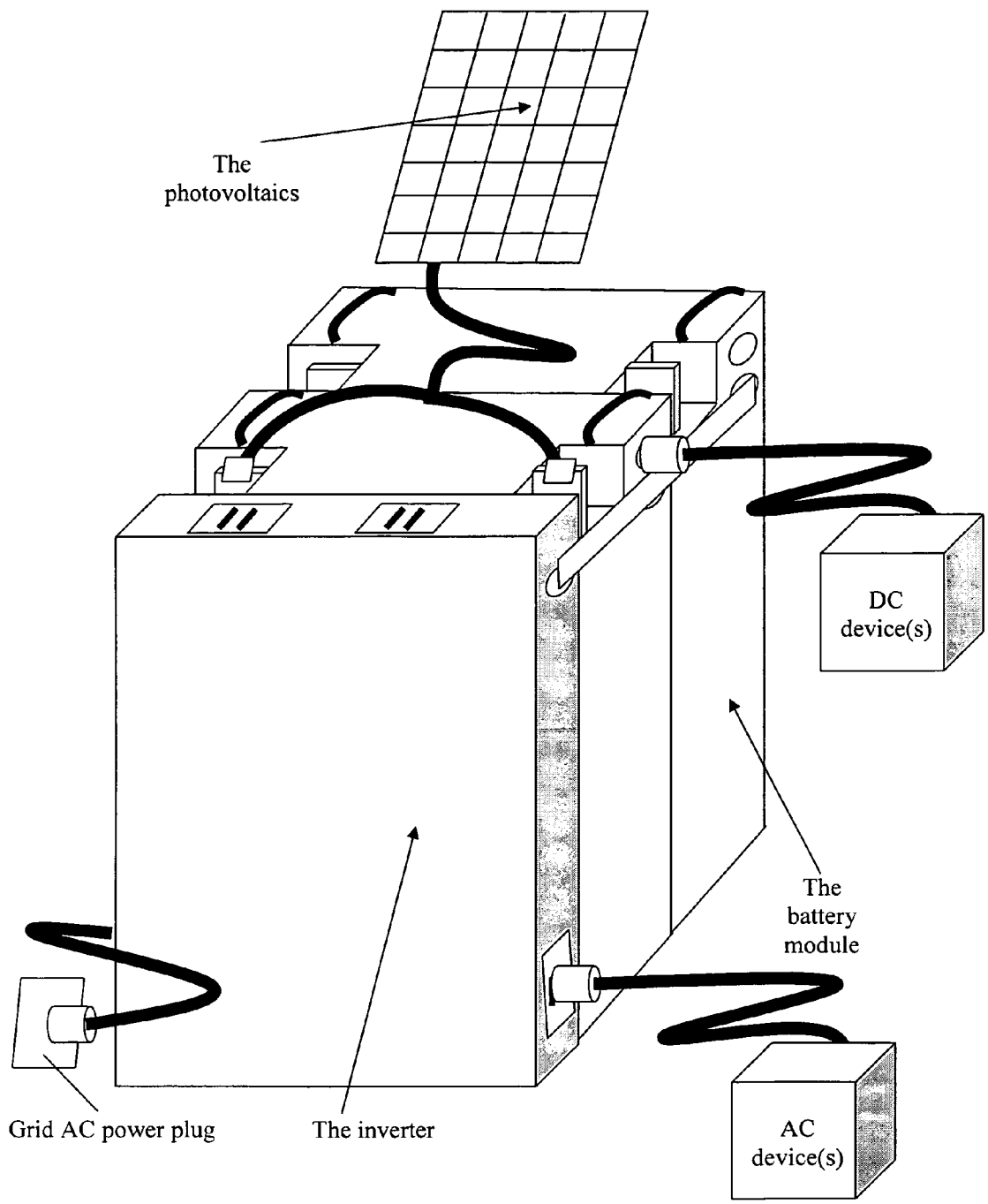
FIG. 7 shows the configuration of the system being discharged by the AC and DC devices and recharged by AC and DC (solar panel) power sources simultaneously.

AC/DC Discharge with AC/DC Charge After Cut-Off Limit of the Battery Module is Reached In the present example, one of the most complicated cases is analyzed. This case is simultaneous discharge of AC and DC devices and the complete discharge of the battery module. The configuration of the whole system is shown in FIG. 7. When AC and DC devices are all connected to the system as shown in FIG. 7, the AC device will be cut-off by the inverter first followed by the DC device being cut-off by the battery module. Under such condition, if both AC and DC power sources are provided, the AC device will be powered by the grid AC power and the battery module will be recharged by both the grid AC power and the solar panel. It should be noted that one of the relays (or all, depending on how deep the discharge is) of the battery modules that met the low voltage cut-off are resumed manually before normal charging. When the relay of the battery module is resumed, the battery module is under-charging from the inverter and the DC power source. Since all battery modules were equilibrated during the discharge process, no charging current coming from other battery modules is expected. This charging process proceeds until the high voltage limit of the battery module ($V_{BH}$, 4.0V) is reached followed by the battery relay being open until battery voltage drops to a lower voltage of 3.5V (relay close). During the battery over-charge process, the voltage of the battery module may already become higher than the high voltage limit of the inverter for recharging the battery voltage ($V_H$, 14.6V) such that it may damage the inverter. Under such a condition, the inverter recharging to the battery module function is disabled (when $V_H'$, 14.7V is met) until a re-plug-in action is conducted. Besides, if all battery relays are all open and still the DC power source input from solar panel is still active, it is possible for voltage (connected to the solar panel) to exceed another inverter limit V'''=16V. Under such circumstance, the inverter AC output function (source from the battery modules) is disabled until the voltage drops down below V'''. However, since the grid AC power source is present, the AC output is still active but with the energy source from the battery modules disabled.

During this entire recharging process, if the charge current is too large such that it may cause heating of the battery module being charged, the relay of the battery module being charged has an open/close function using the thermal sensor/switch shown in FIG. 4. The DC device function will not be affected during this charging process since both AC and DC power sources are present. Even AC power for recharging is disabled owing to the over-charge condition (>14.7V), still the solar panel is providing energy until the solar energy supply becomes weak (drops in voltage) that eventually prevents the battery modules from being over-charged. Therefore the battery modules can work normally (with relay closed) as a power supply to the DC device. In the case of the AC device, as long as the grid AC power is present, there are no problems with the power source throughout the whole charging process described above. Once the AC grid power source is disconnected, the AC device relies on the battery module energy source again unless the battery module voltage is less than $V_L'$ (12.5V), the AC device performance will be stopped owing to insufficient charging to the battery that may cause rapid over-discharge of the battery module.

Example 4

An UPS System

In the present example, one of the unique AC applications is analyzed. The utilization of the UPS function of the present invention which is different from conventional UPS functions because there is a possibility of DC input. One can imagine that if the grid AC power source is absent during the night, the battery modules will work as the power source as a default. If the battery modules can be sustainable for power utilization during the night until the second day sunlight charge is provided, the performance of the AC device will be continued as a result of a non-stop UPS. The present working mechanism has been explained in the earlier section as the case "AC discharge with both AC and DC charge before cut-off limit of the inverter is reached" (also please refer to FIG. 5(d)) that was analyzed in example 1. A true non-stop UPS compared to conventional UPS can be constructed using the inverter and the battery modules of the present invention.

The invention claimed is:

1. A portable power storage and supply system, comprising AC charging means, DC charging means, AC discharging means and DC discharging means, wherein said DC charging means includes means for inputting electrical energy from a renewable energy source, and control means for operating:

two or more of the charging means and at least one of the discharging means simultaneously, or two or more of the discharging means and at least one of the charging means simultaneously.

2. The portable power storage and supply system of claim 1 having an inverter with at least one battery module electrically connected to the inverter.

3. The portable power storage and supply system of claim 2, wherein the portable power storage and supply system has a plurality of battery modules connected in parallel and all of the battery modules have substantially similar electrical characteristics.

4. The portable power storage and supply system of claim 2, wherein the inverter is controlled to:
- be bypassed when AC power is available from an AC power grid connected to the inverter,
- provide DC power to the battery modules at an upper voltage ($V_H$) for charging the battery modules,
- stop providing DC power to recharge the battery modules when $(V) \geq (V_H')$ where $V_H'$ is the voltage protecting the inverter from being charged while it is recharging the battery modules, and
- stop providing AC power to devices when $(V) \geq (V_H'')$ where $V_H''$ is the voltage protecting the inverter from being damaged by high DC voltage input, and
- allow discharging of the battery modules until a battery modules voltage $(V) < (V_L)$ where $V_L$ is the lower voltage limit of the inverter, and
- allow further discharging of the battery modules when voltage goes back to $(V) > (V_L')$ where $V_L'$ is within normal working voltage range of the inverter once the condition of $(V) < (V_L)$ was met in earlier discharging, and wherein each battery module comprises:
- a plurality of battery cells connected in series,
- a controller that monitors each battery cell connected in series,
- a current or thermal fuse for disconnecting the battery module from the inverter if over-current or overheating occurs,
- means for disconnecting the battery module from the inverter if a battery cell voltage $(V) >$ a high battery voltage $(V_{BH})$ and reconnecting the battery module to the inverter if $(V) < (V_{BH}')$ where $V_{BH}'$ is within normal working voltage range of the battery, and
- means for disconnecting the battery module from the inverter if a battery cell voltage $(V) <$ a low battery voltage $(V_{BL})$.

5. The portable power storage and supply system of claim 4, further comprising means for providing a visual or audible signal if $(V) < (V_{BL})$.

6. The portable power storage and supply system of claim 2, wherein
the inverter and one or more battery modules are connected together using tabs for holding the inverter and battery module(s) together.

7. The portable power storage and supply system of claim 2, wherein each battery module comprises Lithium Iron Phosphorous Oxide battery cells.

8. The portable power storage and supply system of claim 2, wherein each battery module includes at least one controller for controlling a relay for the electrical connection to the inverter.

9. The portable power storage and supply system of claim 2, wherein each battery module includes a sensor for providing a signal to a controller for breaking the electrical connection to the inverter when a high temperature or high current condition is present.

10. The portable power storage and supply system of claim 2, wherein the portable power storage and supply system has a plurality of battery modules connected in parallel and all of the battery modules have substantially similar physical characteristics.

11. The portable power storage and supply system of claim 2, wherein each battery module is separable from the system for providing DC energy.

12. The portable power storage and supply system of claim 11, wherein each battery module includes terminals for accommodating automotive battery jumper cables and an outlet for accommodating a DC electrical plug.

13. The portable power storage and supply system of claim 1, wherein means for DC discharging includes terminals for accommodating automotive battery jumper cables and an outlet for accommodating a DC electrical plug.

14. The portable power storage and supply system of claim 1, wherein the system is used as a non-stop UPS.

* * * * *